US007262906B2

(12) United States Patent
Gilbert et al.

(10) Patent No.: US 7,262,906 B2
(45) Date of Patent: Aug. 28, 2007

(54) MEANS FOR TRANSPORTING A MICROSCOPE

(75) Inventors: Manfred Gilbert, Schoeffengrund (DE); Kenneth M. Northem, West Seneca, NY (US)

(73) Assignee: Leica Microsystems CMS GmbH, Wetzlar (DE)

( * ) Notice: Subject to any disclaimer, the term of this patent is extended or adjusted under 35 U.S.C. 154(b) by 28 days.

(21) Appl. No.: 10/811,348

(22) Filed: Mar. 26, 2004

(65) Prior Publication Data

US 2005/0213200 A1     Sep. 29, 2005

(51) Int. Cl.
*G02B 21/00*     (2006.01)
(52) U.S. Cl. ........................................ 359/368; 359/382
(58) Field of Classification Search ........ 359/368–390, 359/800–819; D16/130–134; D8/6–13, D8/107
See application file for complete search history.

(56) References Cited

U.S. PATENT DOCUMENTS

| 949,749 | A | * | 2/1910 | Patterson | 359/382 |
|---|---|---|---|---|---|
| 1,996,141 | A | * | 4/1935 | Broadhurst et al. | 359/397 |
| 2,135,870 | A | * | 11/1938 | Fassin | 359/383 |
| 2,206,180 | A | * | 7/1940 | Gerstenberger et al. | 359/385 |
| 2,214,367 | A | * | 9/1940 | Gallasch | 359/382 |
| 2,417,044 | A | * | 3/1947 | Blomgren | 359/382 |
| 2,530,352 | A | * | 11/1950 | Gallasch | 359/390 |
| D243,601 | S | * | 3/1977 | Leeming et al. | D16/131 |
| 4,277,133 | A | * | 7/1981 | Staehle | 359/380 |
| 4,736,219 | A | * | 4/1988 | Yamanaka et al. | 396/540 |
| 5,406,731 | A | * | 4/1995 | Stevens | 42/71.02 |
| 5,556,150 | A | * | 9/1996 | Ampel | 294/118 |
| D400,548 | S | * | 11/1998 | Komatsuzaki | D16/131 |
| 5,844,714 | A | * | 12/1998 | DiResta | 359/368 |
| D426,136 | S | * | 6/2000 | Yu | D8/107 |
| D459,744 | S | * | 7/2002 | Apotheloz | D16/131 |
| 6,512,513 | B2 | * | 1/2003 | Fleck et al. | 345/179 |

FOREIGN PATENT DOCUMENTS

GB      2 235 062      * 2/1991      ................. 359/368

* cited by examiner

*Primary Examiner*—Thong Q Nguyen
(74) *Attorney, Agent, or Firm*—Simpson & Simpson, PLLC

(57) ABSTRACT

A microscope includes a microscope arm having an interior and an exterior surface. The interior surface has at least one recessed portion disposed therein extending from the interior surface of the microscope arm to an inner recess surface of the microscope arm. The recessed portion forms a surface for gripping the microscope. A portion of the recessed portion is, preferably, disposed above the stage and below the objective turret of the microscope. The recessed portion may comprise a textured surface for increasing the static coefficient of friction thereof.

5 Claims, 5 Drawing Sheets

MEANS FOR TRANSPORTING A MICROSCOPE

FIELD OF THE INVENTION

The present invention relates generally to microscopy, and more specifically to improved means for safely transporting a microscope.

BACKGROUND OF THE INVENTION

As is well known, microscopes are optical instruments used to view, examine and study very small objects. There are many different types of microscopes with different types being best suited for particular applications. Types of microscopes include, but are not limited to: compound microscopes, stereomicroscopes, confocal microscopes, inverted microscopes, and laser microscopes, etc. While advancements in microscope optics and microscopy methods have burgeoned in recent years, means for safely and efficiently transporting microscopes have not.

Indeed, microscopes are often required to be transported, for example, from the point of manufacture to the point of sale and/or to the point of use. Typically, when microscopes are transported from point of sale to point of use, they are transported within shipping containers or microscope cases that are specifically designed for such use. Such containers and cases typically comprise shock absorbing materials for preventing the microscope from becoming damaged. Such methods of transporting are perhaps, the safest. Alternatively, where a microscope is transported, for example, from one laboratory to another within a building, the microscope may be placed on a wheeled cart or the like for safe transport. Transporting a microscope via a cart while somewhat safe, is simply not as safe as transporting a microscope within a container specifically designed therefore. However, where a microscope is transported, for example, from one room to another or from one location to another within a same room, the microscope is usually transported by hand. Because hand transportation of microscopes is perhaps, the most dangerous method for transporting a microscope, as many school children may attest, when transporting a microscope by hand, the prudent individual grasps an arm portion of the microscope with a first hand and uses their remaining free hand to support the microscope from below its base.

While such methods are usually sufficient for transporting a microscope by hand, the incorporation of carrying means into a microscope stand offers additional assurance that the microscope will not be damaged during hand transport. While means, for example handles, for transporting microscope are known, such means may statically protrude from the microscope stand, which can be problematic when space is limited, swing in and out from the body of the microscope stand as illustrated in U.S. Pat. No. 4,427,270, or they may extend and retract from the body of the microscope stand, etc. While handles that swing in and out or extend and retract have advantages over those that statically protrude, such handles often require complex mechanical means in order to perform their operations. The addition of mechanical devices for handles can increase the manufacturing cost of a microscope.

What is needed then is a means for securing and transporting a microscope that does not statically protrude from the microscope stand and does not require complex mechanical means.

BRIEF SUMMARY OF THE INVENTION

The present invention broadly comprises a microscope having a microscope arm. The microscope arm has an interior surface and an exterior surface. The interior surface comprises at least one recessed portion. The recessed portion extends from the interior surface of the microscope arm to an inner recess surface of the microscope arm. The recessed portion is sufficiently deep such that a gripping force that is required for securing the microscope is reduced. In a preferred embodiment, the recessed portion disposed at a position above the microscope stage, yet below the objective turret. Preferably, portions of one or more walls or surfaces forming the recessed portion are arcuate, spherical and/or ellipsoid such that the recessed portion may be ergonomically configured. The recessed portion may further comprise a textured surface for increasing the static coefficient of friction thereof and the interior surface may comprise a removable panel.

Thus, an object of the invention is to provide an improved means for transporting a microscope by hand.

Another object of the invention is to provide a means for transporting a microscope which does not statically protrude from said microscope.

A further object of the invention is to provide a means for transporting a microscope which does not statically protrude from said microscope, but which means does not simultaneously require mechanical means.

These and other objects, features and advantages of the present invention will become readily apparent to those having ordinary skill in the art upon reading the detailed description of the invention in view of the drawings and appended claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

It should be appreciated at the outset that while the present invention relates to a "Means for Transporting a Microscope", the assignees of the present application for patent have developed certain other improvements to microscopes described in United States patent application No. 10/810, 346, entitled, "Interchangeable Microscope Drive Stage Assembly"; No. 10/811,346, entitled, "Releasable/Interchangeable Fine Focus Knob for a Microscope"; No. 10/811,344, entitled, "Ergonomically Arranged Object Adjustment Controls"; No. 10/810,979, entitled, "Shielded-Ergonomic Microscope Stages"; and No. 10/810,980, entitled. "Lamp Assembly for a Microscope", which applications were filed Mar. 26, 2004 concurrently herewith by the assignees of the present application for patent, which applications are incorporated herewith by reference in their entireties.

At the outset, it should be appreciated that like drawing numbers on different drawing views identify identical structural elements of the invention. While the present invention is described with respect to what is presently considered to be the preferred embodiments, it is understood that the invention as claimed is not limited to the disclosed embodiments. In the detailed description and claims that follow, the terms "front", "rear", "left", "right", "top", "bottom", and their derivatives or correlates, as they relate to sides of the microscope and/or directions of movement, are intended to be interpreted from the standpoint of an individual standing in front of the microscope of FIG. 1 so as to peer through the eyepieces. Hence, the eyepieces and stage would be closest the individual's body. The term "interior" as it relates to the arm of a microscope is intended to refer to that side of the microscope arm facing and closest an individual standing in front of the microscope so as to peer through the eyepieces. "Exterior" as it relates to the arm of a microscope is intended to refer to that side of the microscope arm facing away and furthest from the individual standing in front of the microscope as if to peer through the eyepieces. Hence, the exterior side of the microscope arm of FIG. 1 also comprises the rearward side of the microscope. "Grip", "gripping" and the like as they relate to surfaces, recesses and indentations for gripping a microscope are intended to refer to surfaces having sufficient surface areas configured for receiving substantial portions of a individual's hand or portions of the fingers thereon or therein.

Figure 1:
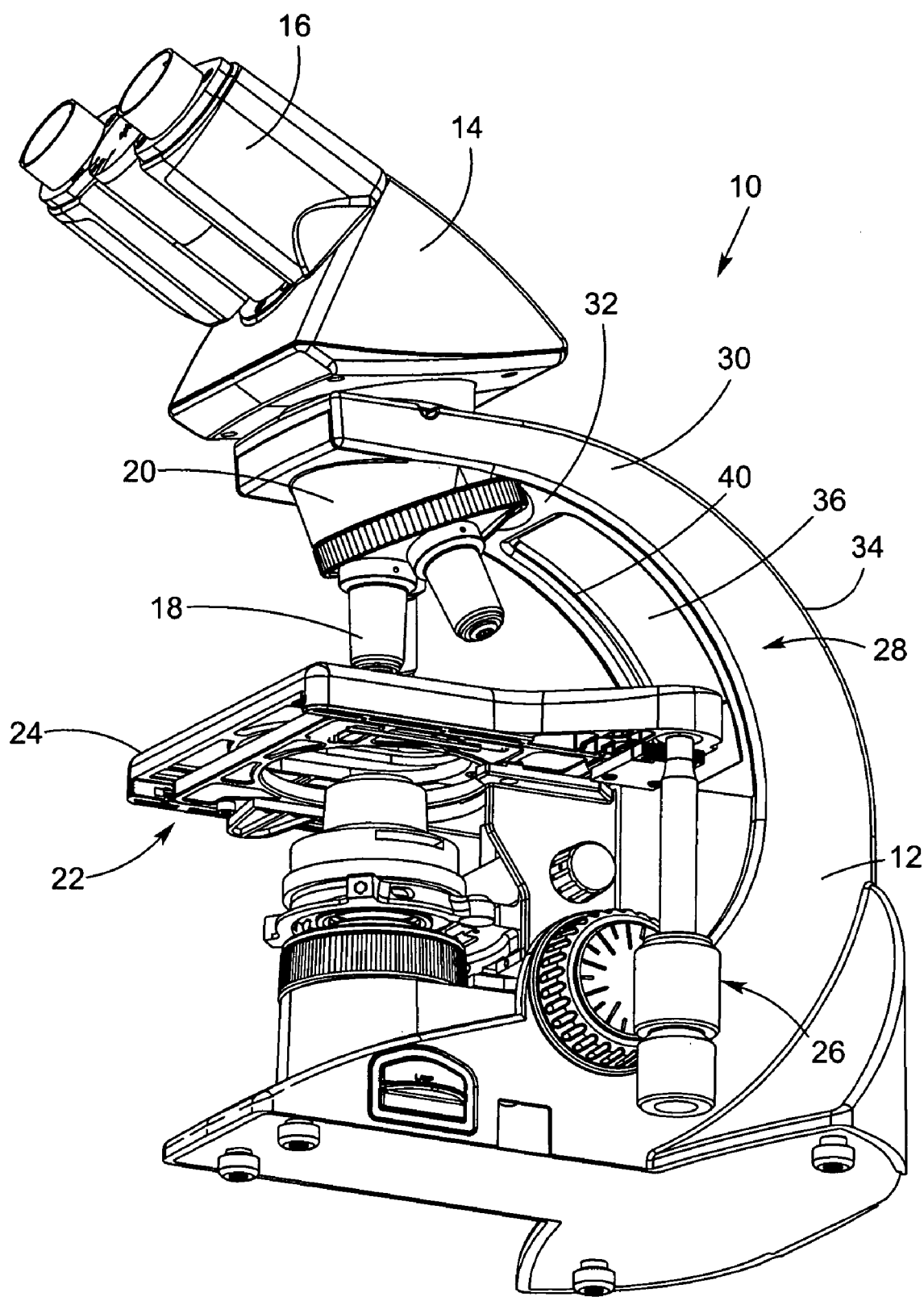
FIG. 1 is a perspective view of a microscope comprising a means for transporting a microscope according to the present invention.
Figure 2:
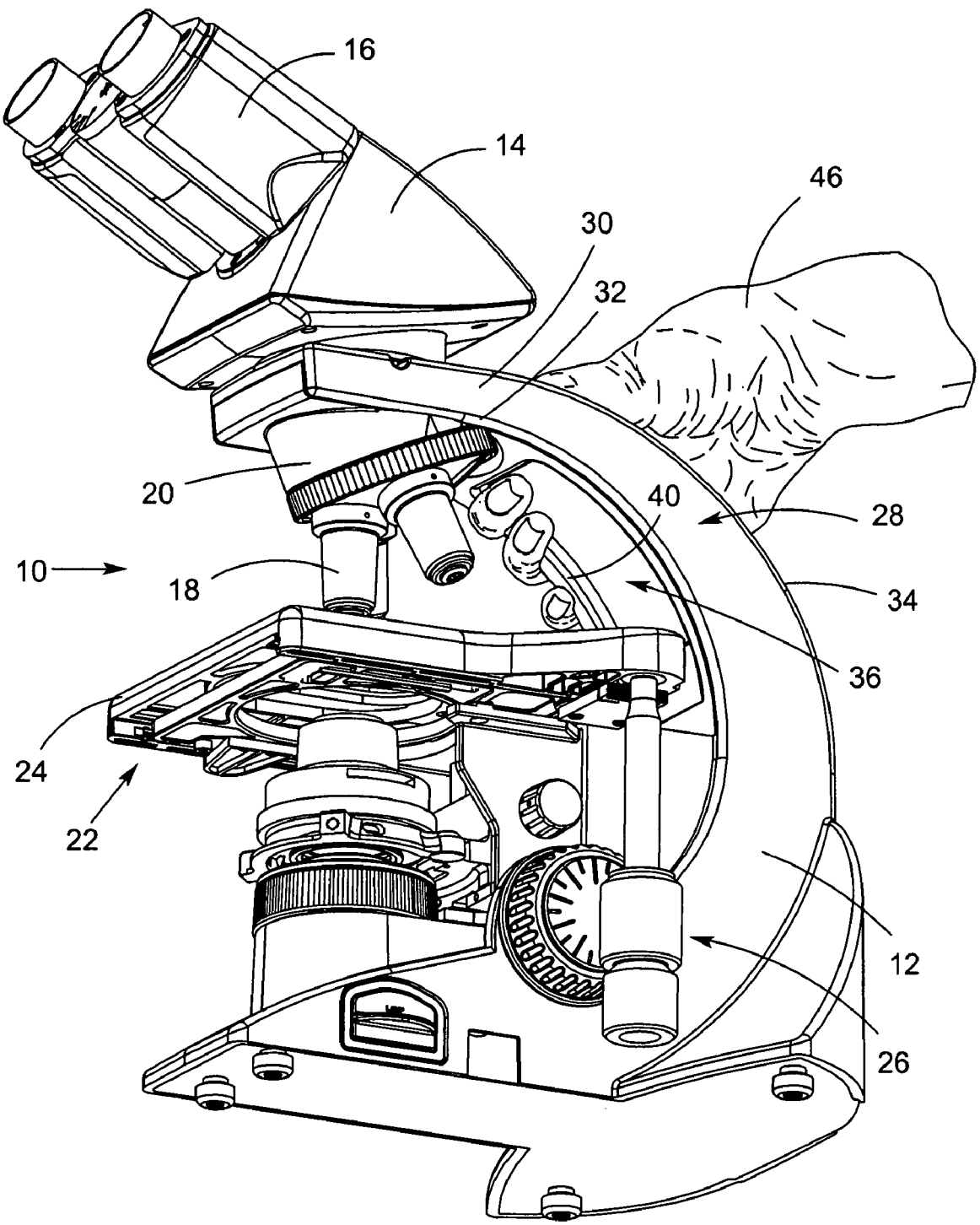
FIG. 2 is a perspective view of a microscope illustrating an individual utilizing a means for transporting a microscope according to the present invention.

Adverting now to the figures, FIGS. 1 and 2 illustrate microscope 10 comprising a means for transporting a microscope according to the present invention. From FIGS. 1 and 2 it is seen that the general structures of microscope 10 include mounting stand 12 to which the various components of the microscope are mounted. In the embodiment shown, viewing body 14 is binocular comprising two eyepieces 16. The viewing body is not particularly germane to the invention, which is suitable for use with a microscope configured with any type of viewing body (monocular, binocular, trinocular, video, etc.). Objective lenses 18 are mounted to objective turret 20. Microscope 10 may comprise interchangeable microscope stage system 22, which is mounted to stand 12. Interchangeable microscope stage system 22 comprises slide mount (not shown), stage 24, and stage drive mechanism 26. The slide mount is incorporated into stage system 22 and enables movement of a slide holding a specimen.

Microscope 10 according to the present invention further comprises means for transport 28 disposed on microscope arm 30. In a preferred embodiment microscope arm 30 is arcuate and further comprises interior surface 32 and exterior surface 34. Interior surface 32 preferably comprises a removable injection molded polymer panel, which extends from a location proximate stage 24, passes around objective turret 20 and terminates proximate viewing body 14. Hence, interior surface 32 may be removed from the microscope arm for servicing, if needed. Interior surface 32 and exterior surface 34 may be connected to one another by sides such that the cross-section of a portion of microscope arm 30 would be polygonal in shape. It should be appreciated by those having ordinary skill in the art, however, that the microscope arm could comprise an arcuate, spherical or ellipsoidal cross-sectional shape.

Figure 3:
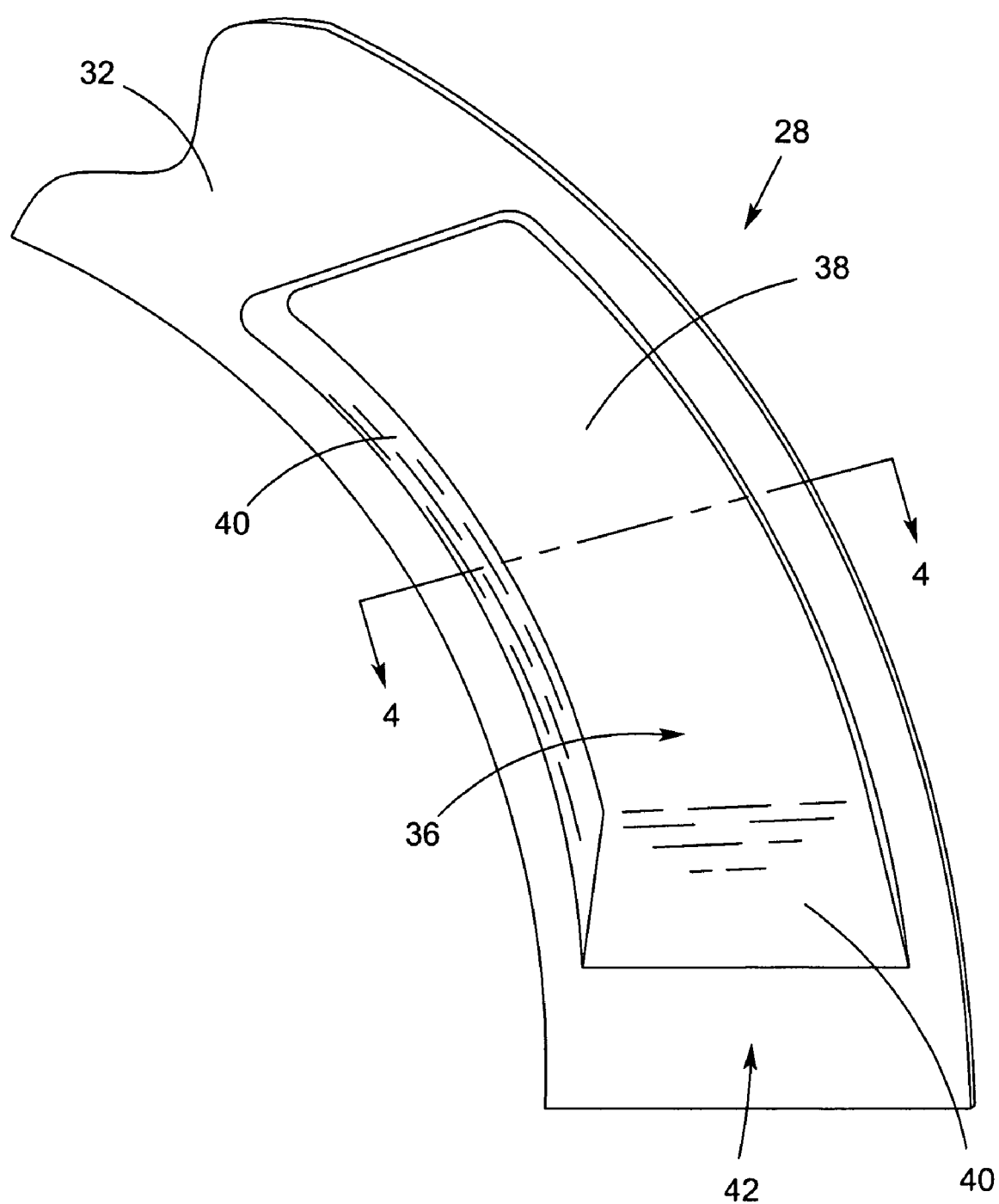
FIG. 3 is a close-up partial perspective view of a lower portion of the interior surface panel of the present invention illustrated in FIGS. 1 and 2.

As illustrated in FIGS. 1-3, means for transport 28, preferably, comprise at least one recessed portion 36. Recessed portion 36 is disposed on interior surface 32 of microscope arm 30, preferably, such that a substantial portion thereof is located at a position above stage 24 and below objective turret 20. As illustrated more clearly in FIGS. 3 and 4, recessed portion 36 generally comprises an indentation within interior surface 32 and comprises inner recess surface 38 which connects to interior surface 32 by one or more walls 40. Recessed portion 36 is sufficiently deep to accept the fingers of an individual. Thus, a hand may be wrapped about the microscope arm and the fingers placed within the recessed portion such that the gripping surface is increased and the gripping force required for securing the microscope, reduced.

In the embodiment illustrated in FIGS. 1-4, recessed portion 36 comprises a plurality of walls 40, which are substantially planar and which gradually slope from interior surface 32 to inner recess surface 38 to form an indentation. Hence, if one were to view the recessed portion of FIG. 3 from the side, the recessed portion would appear as an arcuately-shaped trapezoid whose two parallel sides (interior surface 32 and inner recess surface 38) followed the curvature of microscope arm 30. It should be appreciated by those having ordinary skill in the art that by "substantially planar" it is meant that at least a portion of the walls and surfaces of the recessed portion comprise a planar surface. For example, walls 40 are "substantially" planar in that they are planar except for that portion where they meet with recess inner surface 38 and/or interior surface 32 wherein at which point they may be curved for improving ergonomics. Additionally, while walls 40 are described as gradually sloping from interior surface 32 to inner recess surface 38, and/or vice-versa, walls 40 may slope as desired. Additionally, walls 40, interior surface 32 and/or inner recess surface 38 may comprise a textured surface, for example a knurled surface, textured painted surface, etc., for increasing the static coefficient of friction thereof such that the force of friction between the recessed portion and hand 46 may be increased.

Additionally, it should be appreciated by those having ordinary skill in the art that while a plurality of substantially planar walls and surfaces are illustrated herein, the walls and surfaces of the recessed portion of the present invention may comprise arcuate, spherical or elliptical shapes. For example, recessed portion could comprise an elliptical indentation such that inner recess surface 38 and walls 40 were one and the same. Alternatively, recessed portion 36 could be configured to comprise one or more indentations shaped for complementarily receiving a portion of a human hand and/or fingertips. Of course, other suitable contoured shapes could be utilized. Additionally, it should be appreciated by those having ordinary skill in the art that while recessed portion 36 is arranged on an interior surface of a microscope arm, it could be disposed on other sides of a microscope. For example, the recessed portion could extend from interior surface 32 to one or more sides, or to exterior surface 34 of microscope arm 30, e.g. wrapping around the microscope arm in the form of a handgrip.

Figure 4:
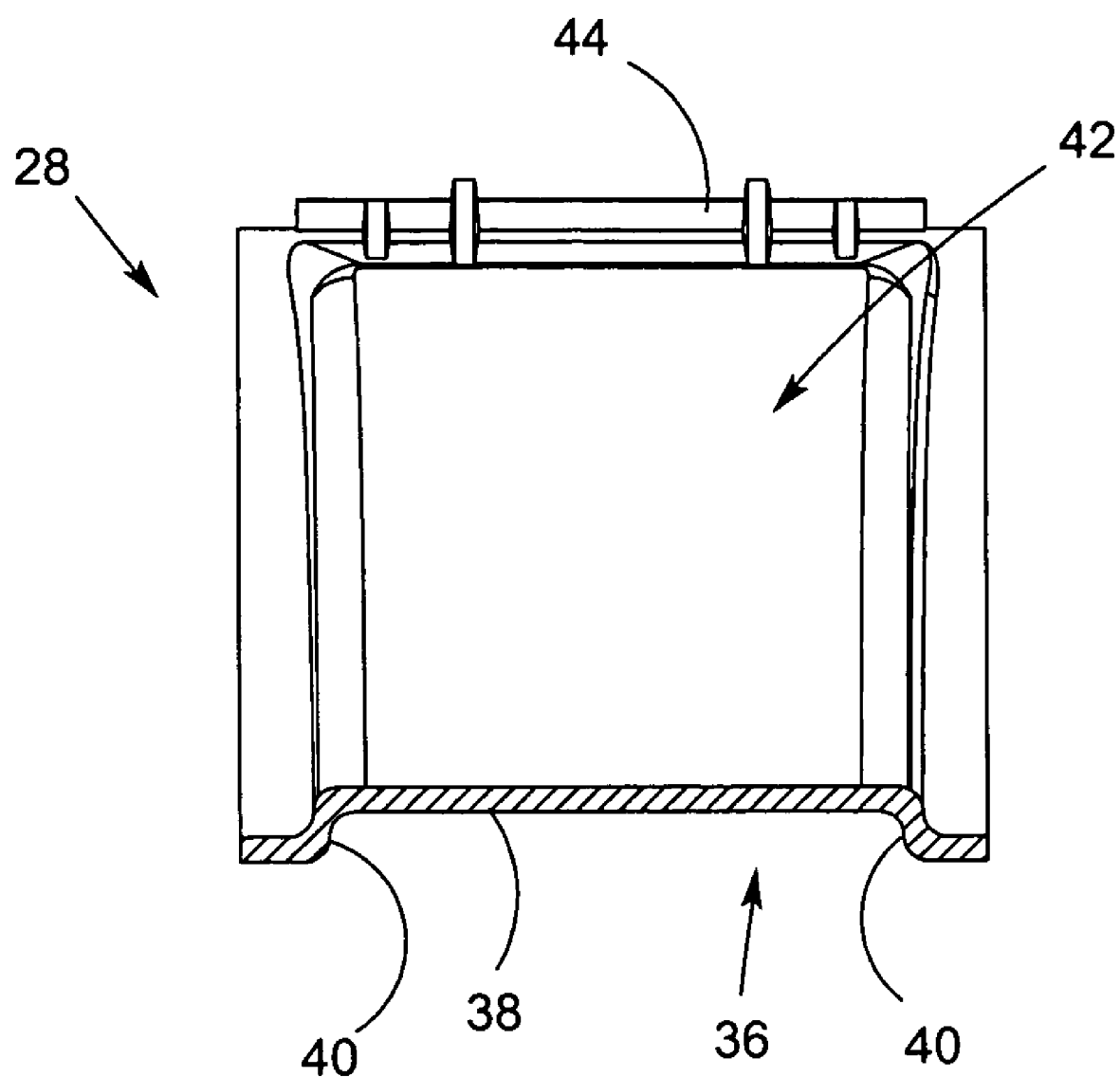
FIG. 4 is a cross-sectional view taken generally along line 4-4 of FIG. 3 of a means for transporting a microscope according to the present invention, which view is a top view of a rearward side of panel of an interior surface of microscope arm.
Figure 5:
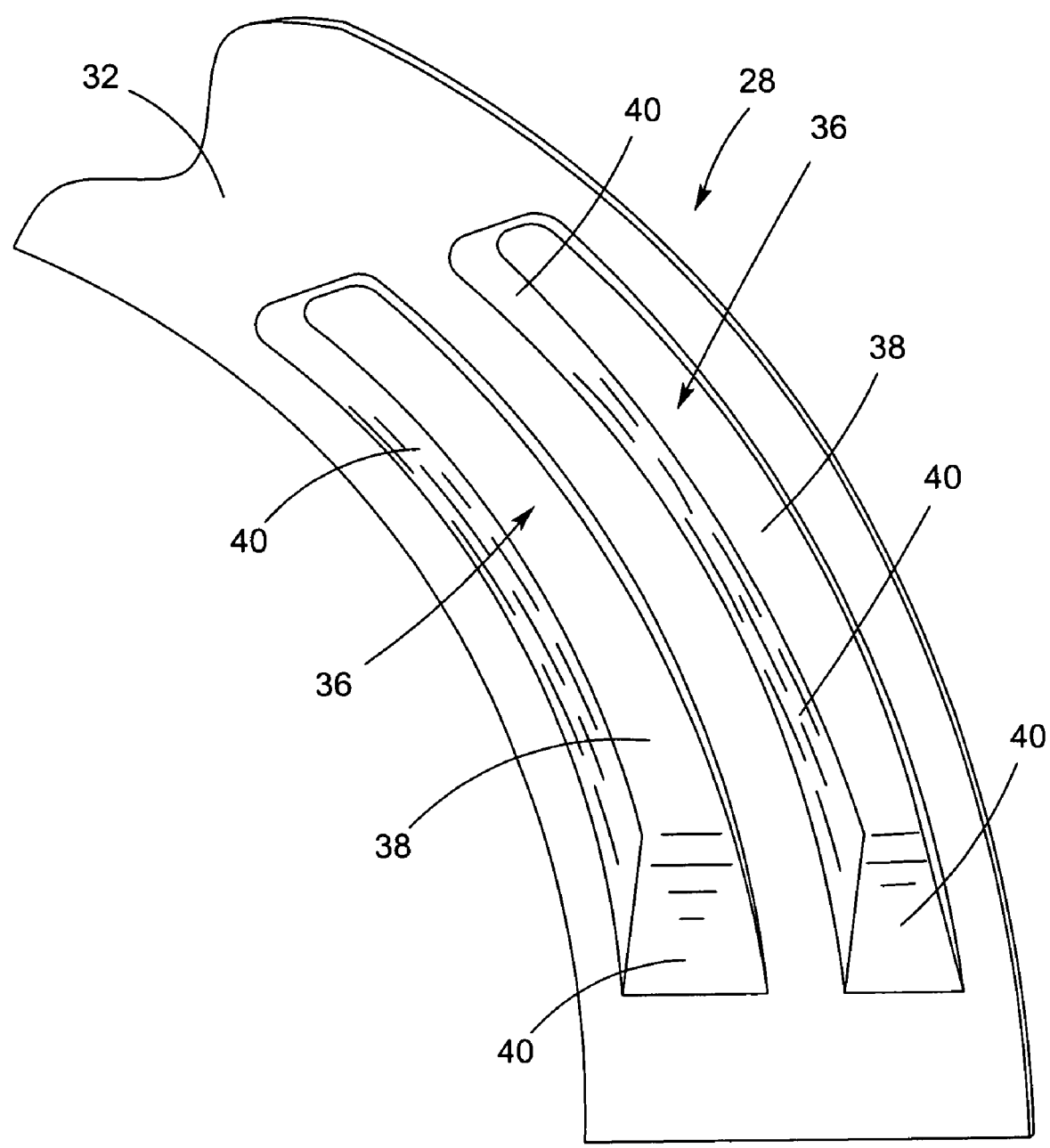
FIG. 5 is close-up perspective view illustrating alternative means for transporting a microscope according to the present invention.

FIGS. 3 and 4 further illustrate that recessed portion 36 may be formed within an interior surface of the microscope, which is removable from the microscope arm. As illustrated more clearly in FIG. 4, it is seen that lower portion 42 of the panel comprises releasable fastening means 44 such that the panel may be removed and re-secured to the microscope arm. Releasable fastening means may include, but are not limited to, bolts, quick release fasteners, releasable locking tabs, for example, of the types typically associated with battery compartments of consumer electronic devices (remote controls, wireless phones, etc.), ball and detent means, hook and loop type fasteners, snaps, etc. Such types of fasteners, however, should be capable of preventing the panel from becoming loose when the microscope is secured, gripped and/or transported. In FIG. 5 it is seen that a microscope according to the present invention may be configured to comprise more than one recessed portion.

Finally, FIG. 2 illustrates that recessed portion 36 may be utilized to more effectively secure a microscope for hand transport thereof. Indeed, FIG. 2 illustrates that recessed portion 36 is configured to be sufficiently deep such that hand 46 may be wrapped about the microscope arm. When hand 46 is wrapped about the microscope arm, the fingertips may be extended into the recessed portion to apply a gripping force upon inner recess surface 38, walls 40 and interior surface 32, etc. Hence, because the recessed portion provides an increased number of surfaces by which the microscope may be gripped, the effective gripping force required to secure the microscope is reduced when compared with microscopes comprising mere planar arm surfaces. Consequently, the present invention provides a more effective means for securing and gripping a microscope when compared to known microscopes.

Thus, it is seen that the objects of the present invention are efficiently obtained, although modifications and changes to the invention should be readily apparent to those having ordinary skill in the art, which modifications are intended to be within the spirit and scope of the invention as claimed.

What is claimed:

1. A microscope comprising:
an arcuate microscope arm, said arcuate microscope arm comprising an interior and an exterior surface; said interior surface comprising at least one recessed portion, said at least one recessed portion is arcuate and extends from said interior surface of said microscope arm to an inner recess surface of said microscope arm, said at least one recessed portion comprising a surface for gripping said microscope, wherein said interior surface is proximate to a user of said microscope and said exterior surface is opposite said interior surface, wherein said at least one recessed portion is a removable panel.

2. The microscope of claim 1 wherein a portion of said at least one recessed portion is disposed above a stage and below an objective turret of said microscope.

3. The microscope of claim 1 wherein said at least one recessed portion comprises at least one wall extending from said inner recess surface to said interior surface and said at least one wall is selected from the group consisting of planar, arcuate, spherical, and ellipsoidal.

4. The microscope of claim 1 wherein said at least one recessed portion comprises a textured surface for increasing a static coefficient of friction thereof.

5. The microscope of claim 1 wherein said at least one recessed portion extends from said interior surface of said microscope arm to a side of said microscope arm.

* * * * *